(12) United States Patent
Hirose et al.

(10) Patent No.: US 10,500,948 B2
(45) Date of Patent: Dec. 10, 2019

(54) FUEL FILLING DEVICE (71) Applicant: NIFCO INC., Yokosuka-shi, Kanagawa (JP)

(72) Inventors: Takatsugu Hirose, Yokosuka (JP); Kensuke Ogose, Yokosuka (JP)

(73) Assignee: NIFCO INC., Yokosuka-Shi, Kanagawa (JP)

(*) Notice: Subject to any disclaimer, the term of this patent is extended or adjusted under 35 U.S.C. 154(b) by 10 days.

(21) Appl. No.: 15/766,615

(22) PCT Filed: Oct. 6, 2016

(86) PCT No.: PCT/JP2016/079853
§ 371 (c)(1),
(2) Date: Apr. 6, 2018

(87) PCT Pub. No.: WO2017/061571
PCT Pub. Date: Apr. 13, 2017

(65) Prior Publication Data
US 2018/0290538 A1  Oct. 11, 2018

(30) Foreign Application Priority Data
Oct. 9, 2015  (JP) .................. 2015-200985

(51) Int. Cl.
*B60K 15/04* (2006.01)
*B60K 15/05* (2006.01)

(52) U.S. Cl.
CPC ...... *B60K 15/04* (2013.01); *B60K 2015/0429* (2013.01); *B60K 2015/0461* (2013.01); *B60K 2015/0538* (2013.01)

(58) Field of Classification Search
CPC .............. B60K 5/04; B60K 2015/0419; B60K 2015/0429; B60K 2015/0461
(Continued)

(56) References Cited

U.S. PATENT DOCUMENTS 2,145,758 A * 1/1939 Fellows ............. B60K 15/0406
220/822
4,176,897 A  12/1979 Cameron
(Continued)

FOREIGN PATENT DOCUMENTS

JP  S55-115595 U  8/1980
JP  2009-083703 A  4/2009
(Continued)

OTHER PUBLICATIONS

Europe Patent Office, "Search Report for European Patent Application No. 16853722.3," dated Mar. 29, 2019.
(Continued)

*Primary Examiner* — Timothy L Maust
(74) *Attorney, Agent, or Firm* — Manabu Kanesaka (57) ABSTRACT

A fuel filling aperture device includes a closing member turned to an open position to open a fuel filling aperture by an introduction of a fuel filling nozzle. The closing member includes a pair of flap members, and urging devices urging the pair of flap members to be positioned at a closed position. Each of the pair of flap members includes a turning assembly portion which becomes a center of the turning, and an abutment portion relative to the other flap member. Also, a seal projecting piece abutting against an opening edge portion of a pass-through opening of the fuel filling nozzle at the closed position, and an edge projecting piece continuing to a terminal of the seal projecting piece, and forming at least one portion of the abutment portion, are formed on a surface portion of each of the pair of flap members.

3 Claims, 13 Drawing Sheets (58) Field of Classification Search
USPC .......................................................... 141/350
See application file for complete search history.

(56) References Cited

U.S. PATENT DOCUMENTS

| | | | |
|---|---|---|---|
| 5,730,194 A | 3/1998 | Foltz | |
| 6,102,234 A | 8/2000 | Kremer et al. | |
| RE37,776 E | 7/2002 | Foltz | |
| 6,539,990 B1* | 4/2003 | Levey | B60K 15/0406 141/301 |
| 7,011,121 B2* | 3/2006 | Bar | B60K 15/04 141/350 |
| 7,461,673 B2* | 12/2008 | Busch | B60K 15/0406 141/348 |
| 10,000,116 B2* | 6/2018 | Sasaki | F01M 11/04 |
| 2008/0087354 A1* | 4/2008 | Cisternino | B60K 15/0406 141/350 |

FOREIGN PATENT DOCUMENTS

| | | |
|---|---|---|
| JP | 2012-220167 A | 11/2012 |
| JP | 5666330 B2 | 2/2015 |
| JP | 2015-096360 A | 5/2015 |
| WO | 2013/046553 A1 | 4/2013 |

OTHER PUBLICATIONS

Japan Patent Office, "Office Action for Japanese Patent Application No. 2015-200985," dated Jan. 8, 2019.
PCT/ISA/210, "International Search Report for International Application No. PCT/JP2016/079853," dated Dec. 13, 2016.

* cited by examiner

FIG. 15

FUEL FILLING DEVICE

FIELD OF TECHNOLOGY

The present invention relates to a fuel filling device.

BACKGROUND ART

As for a device attached to an upper end of a filler pipe (also called an inlet pipe and the like), and opening by an insertion of a fuel filling nozzle of a fuel filling gun so as to feed fuel, there are devices shown in Patent Documents 1 and 2.

The device of the Patent Document 1 includes an upper valve member pushed to open by the fuel filling nozzle, and a lower valve member. Thereby, a screw-type fuel inlet cap is unnecessary. However, the valve member of the Patent Document 1 has a structure of turning around one axis, so that a space for allowing turning to an open position of the valve member which is necessary below the valve member cannot be minimized.

On the other hand, in the device of the Patent Document 2, a dust flap is formed by a pair of semicircular flaps, and each flap has a structure turnably supported in a portion opposite to a portion abutting against the other flap in a closed position so as to minimize a space for allowing the flap to turn to an open position which is necessary below the flap. However, in a case wherein such dust flap is simply formed by the pair of semicircular flaps, when both of the pair of flaps or one of the pair of flaps slightly shift or shifts to a position in a shaft center line direction of a turning shaft thereof, there is a possibility of reducing a sealing performance of the flap.

PRIOR ART DOCUMENTS

Patent Documents

Patent Document 1: Japanese Patent No. 5666330
Patent Document 2: Japanese Unexamined Patent Application Publication No. 2015-96360

SUMMARY OF THE INVENTION

Problems to be Solved by the Invention

A main object of the present invention is to provide a fuel filling aperture device which can form a closing member forming this type of fuel filling aperture device by a pair of flap members more appropriately.

Means for Solving the Problems

In order to obtain the aforementioned object, in the present invention, a fuel filling aperture device comprises a closing member turned to an open position by an insertion of a fuel filling nozzle to open a fuel filling aperture, and the closing member is provided with a pair of flap members, and urging devices urging the flap members to be positioned at a closed position. Also, the pair of flap members is respectively provided with a turning assembly portion which becomes a center of the turning, and an abutment portion relative to the other flap member. Also, on a surface portion of each flap member, there are formed a seal projecting piece abutting against an opening edge portion of a pass-through opening of the fuel filling nozzle at the closed position; and an edge projecting piece continuing to a terminal of the seal projecting piece, and forming at least one portion of the abutment portion.

According to such structure, even in a case wherein both of the pair of flap members or one of the pair of flap members slightly shift or shifts to a position in a shaft center line direction of a turning shaft thereof from a predetermined position, the edge projecting piece of the flap member located at the closed position can press the opening edge portion of the pass-through opening, and even in such a case, a sealing performance of the closing member does not decline.

One of aspects of the present invention is that each of the pair of flap members has a semicircular shape wherein a straight portion thereof is the abutment portion, and comprises the seal projecting piece in such a way so as to form an arc-shaped portion thereof.

Also, one of the aspects of the present invention is that on the surface portion of the flap member, there is provided a groove-shaped recessed portion wherein a cross-sectional shape in a direction parallel to a center axis of the turning has an arc shape, and that the edge projecting piece is formed only in a portion positioned outside the groove-shaped recessed portion in the abutment portion.

Effect of the Invention

According to the present invention, the closing member forming this type of fuel filling aperture device can be formed by the pair of flap members more appropriately.

BEST MODES OF CARRYING OUT THE INVENTION

Hereinafter, based on FIG. 1 to FIG. 15, one of typical embodiments of the present invention will be explained. A fuel filling aperture device according to the embodiment is attached to a filler pipe (omitted in the drawings) to form a fuel filling aperture 5, and opens the fuel filling aperture 5 by insertion of a fuel filling nozzle N to allow the insertion, and automatically closes the fuel filling aperture 5 when the inserted fuel filling nozzle N is pulled out.

Namely, when the fuel filling nozzle N (see FIG. 11) of a fuel filling gun is inserted into the fuel filling aperture 5, such fuel filling aperture device turns the later-described closing member 11 and back-side closing member 31 to an open position to allow the insertion of the fuel filling nozzle N so as to allow fueling, and when the inserted fuel filling nozzle N is pulled out, the fuel filling aperture device returns the later-described closing member 11 and back-side closing member 31 to a closed position to automatically close the fuel filling aperture 5 (see FIG. 12). Thereby, in such fuel filling aperture device, a cap of a screw-type fuel filling aperture 5 is unnecessary.

Such fuel filling aperture device is attached to an upper end portion of the filler pipe (a fuel injection pipe) (not shown in the drawings).

Figure 1:
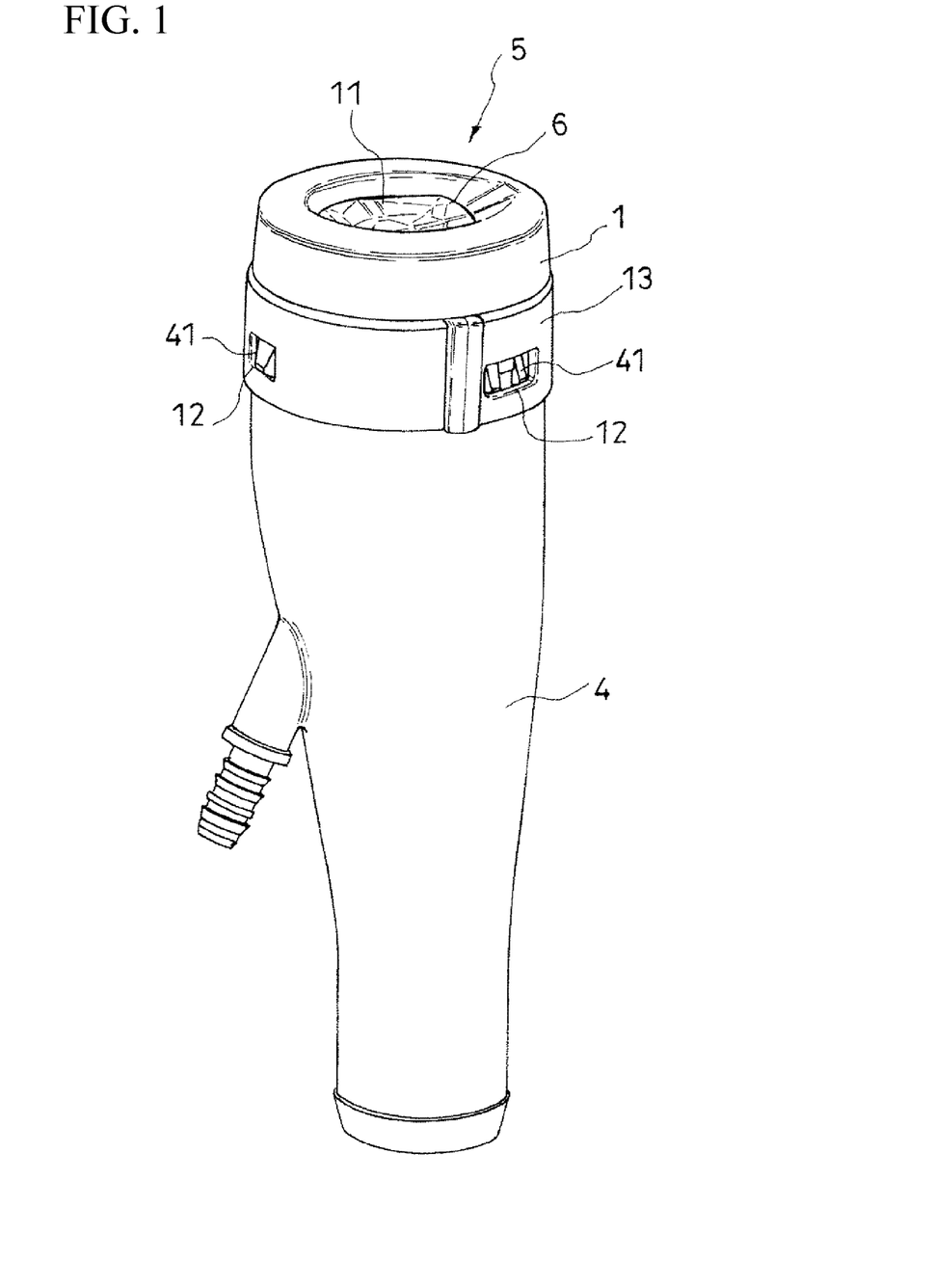
FIG. 1 is a perspective structural view of a fuel filling aperture device according to one embodiment of the present invention.
Figure 2:
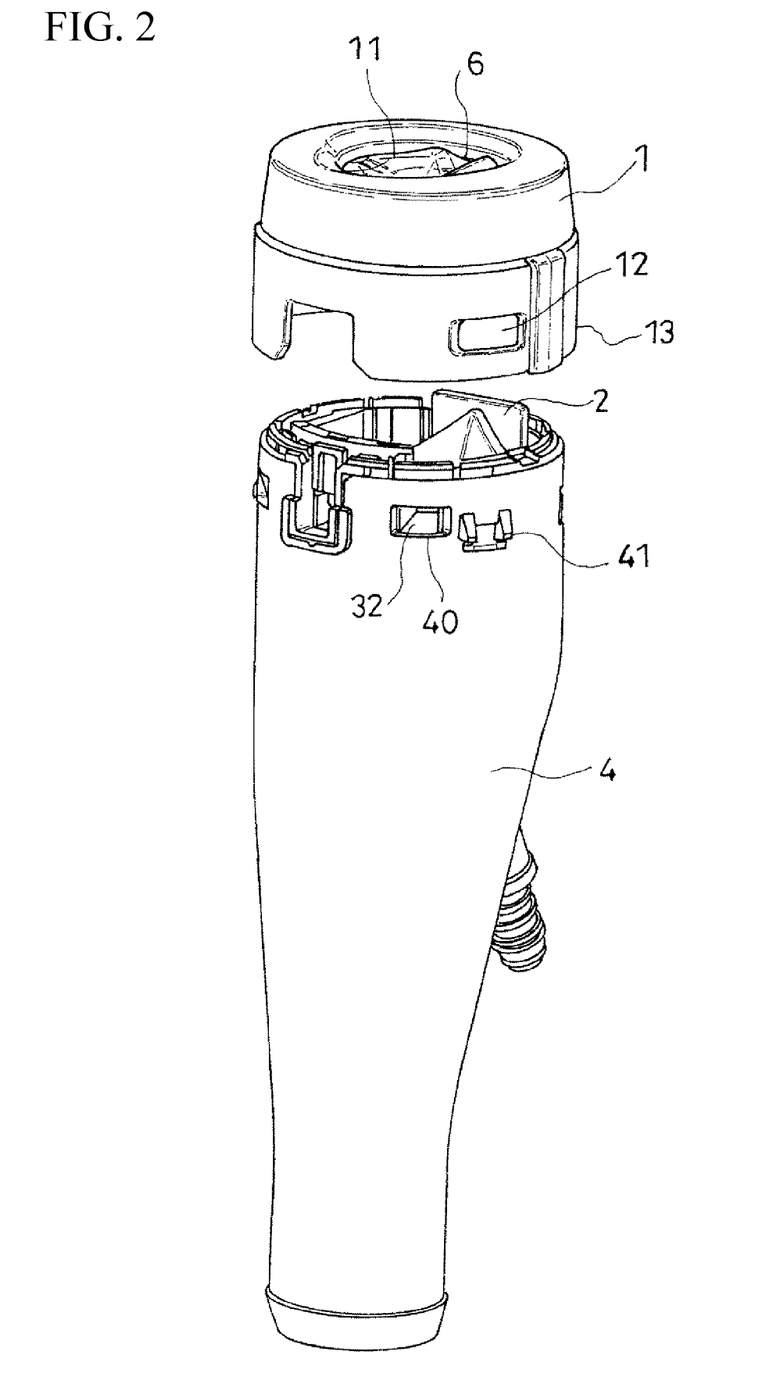
FIG. 2 is a perspective structural view showing a state wherein a cover member forming the fuel filling aperture device is removed from a holder member which is located on a filler pipe side.
Figure 3:
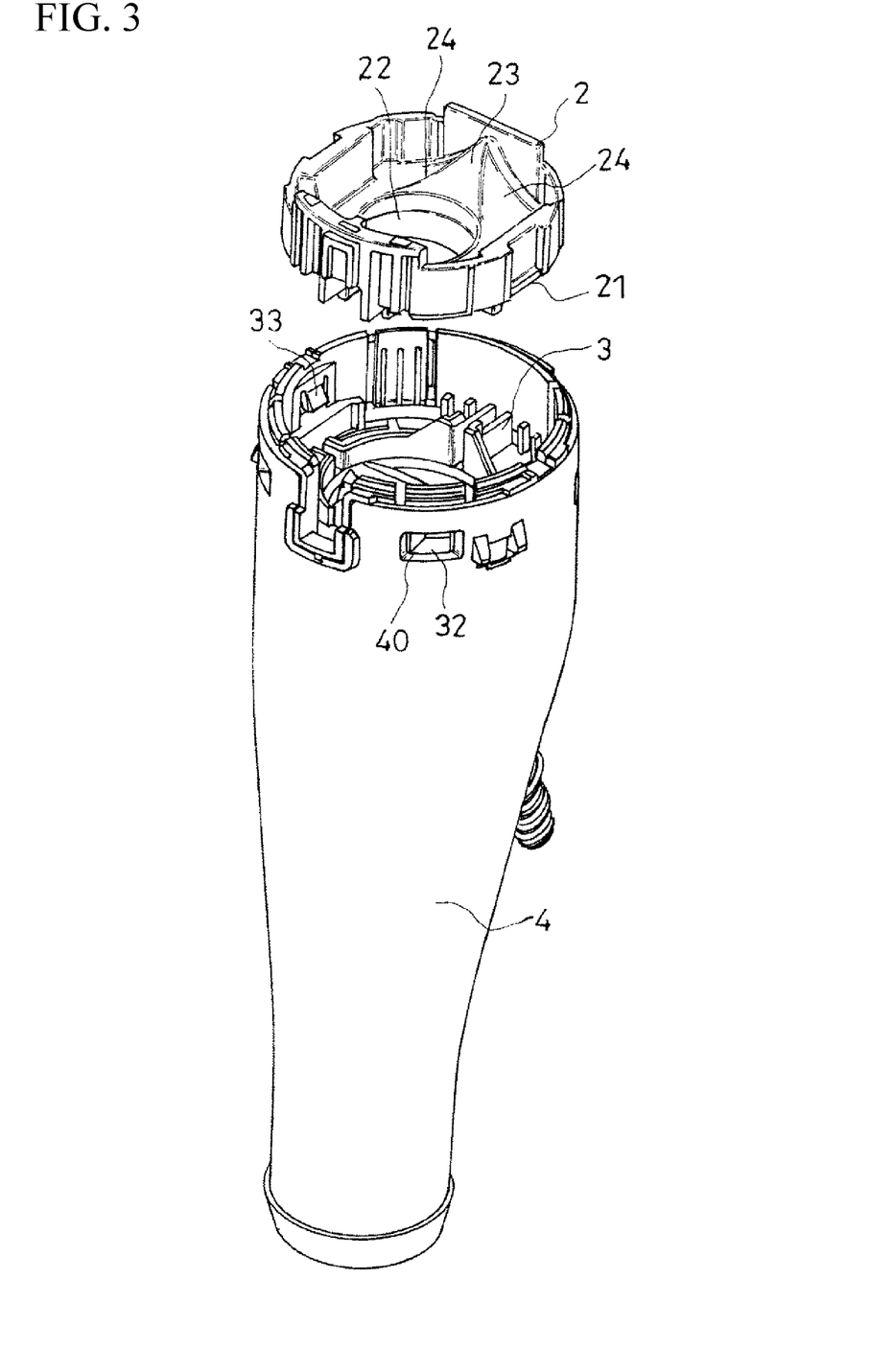
FIG. 3 is a perspective structural view showing a state wherein a guide member forming the fuel filling aperture device is removed further from the state of FIG. 2.

In an illustrated example, as shown in FIG. 1 to FIG. 3, such fuel filling aperture device is formed by a cover member 1, a guide member 2, a seal member 3, and a holder member 4.

The holder member 4 is attached to the filler pipe, is integrated with the filler pipe, and is located on a filler pipe side relative to the cover member 1, the guide member 2, and the seal member 3. The seal member 3 is fitted into such holder member 4, and the guide member 2 is fitted into the seal member 3. The cover member 1 houses an upper end 42 side of the holder member 4, wherein the seal member 3 and the guide member 2 are incorporated, inside the cover member 1 so as to be attached to the holder member 4.

Figure 4:
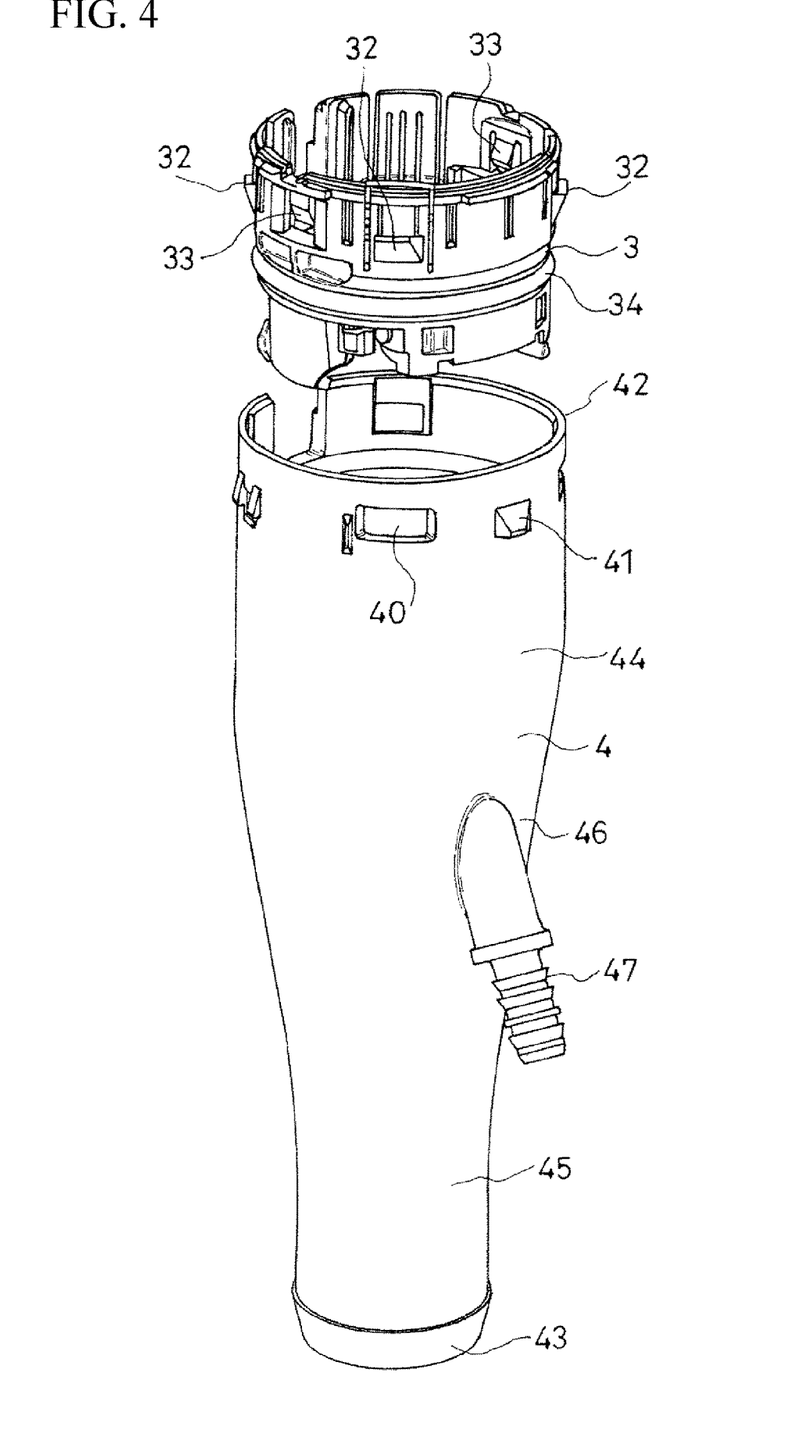
FIG. 4 is a perspective structural view showing a state wherein a seal member forming the fuel filling aperture device is removed further from the state of FIG. 3.

In the illustrated example, the seal member 3 fitted in the holder member 4 engages engagement projecting portions shown by reference numeral 32 in FIG. 4 and formed outside the seal member 3 with window holes 40 formed in the holder member 4.

Also, in the illustrated example, the guide member 2 fitted in the seal member 3 engages engagement pieces 33 formed inside the seal member 3 with engagement step portions shown by reference numeral 21 in FIG. 3 and formed outside the guide member 2.

Also, in the illustrated example, the cover member attached to the holder member 4 engages engagement projecting portions 41 formed outside the holder member 4 with window holes shown by reference numeral 12 in FIG. 2.

Namely, in the embodiment, on a back side of the later-described closing member 11 provided in the cover member 1, there is provided the guide member 2 for the fuel filling nozzle N, and on a back side of the guide member 2, there is provided the seal member 3 provided with the back-side closing member 31 opened and closed by the fuel filling nozzle N. Also, the guide member 2 can be removed by removing the guide member 2 from the filler pipe side by releasing an engagement of the cover member 1, and the seal member 3 can be removed by removing the guide member 2.

(Holder Member 4)

The holder member 4 has a substantially cylindrical shape, and opens both of an upper end 42 and a lower end 43 (see FIG. 4). In the illustrated example, the holder member 4 is attached to the filler pipe by fitting a lower end 43 side thereof into the filler pipe. In the holder member 4, a large diameter portion 44 is located between the upper end 42 and a position approximately in a middle in an up-and-down direction of the holder member 4, and a small diameter portion 45 is located on the lower end 43 side thereof. Also, the holder member 4 is formed by a tapered portion 46 gradually reducing both inner and outer diameters of the holder member 4 as approaching downwardly between the large diameter portion 44 and the small diameter portion 45. The seal member 3 is fitted into the large diameter portion 44 from the upper end 42 of the holder member 4. The reference numeral 47 shown in the drawings represents a branch pipe communicating an upper end with the tapered portion 46 and extending downwardly.

(Seal Member 3)

Figure 11:
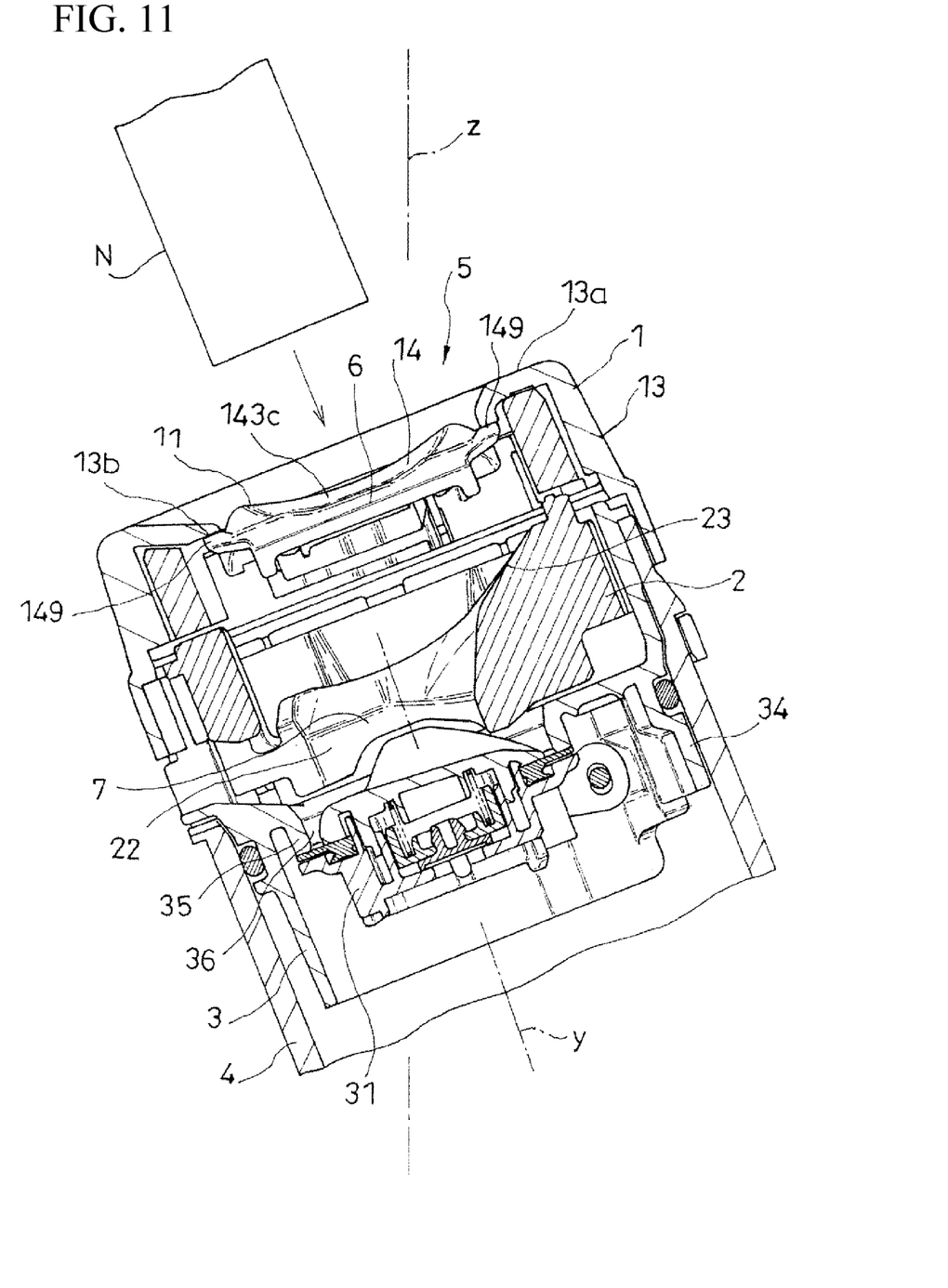
FIG. 11 is a cross-sectional structural view taken along a position of line A-A in FIG. 10.

As shown in FIG. 11, the seal member 3 comprises a cylindrical main member 34 and the back-side closing member 31. The cylindrical main member 34 opens both of an upper end and a lower end, and has a substantially cylindrical shape. Between the upper end and lower end, an internal space of the cylindrical main member 34 is divided into up and down by a partition wall 35. An outer diameter of the cylindrical main member 34 is substantially equal to an inner diameter of the holder member 4.

In the partition wall 35, there is formed a circular pass-through opening 36 allowing the fuel filling nozzle N to pass through. In the closed position, the back-side closing member 31 presses the partition wall 35 from a lower side by urging of an urging device (omitted in the drawings) to close the pass-through opening 36, thereby maintaining a closed state of the fuel filling aperture 5 unless the fuel filling nozzle N is inserted.

(Cover Member 1)

Figure 5:
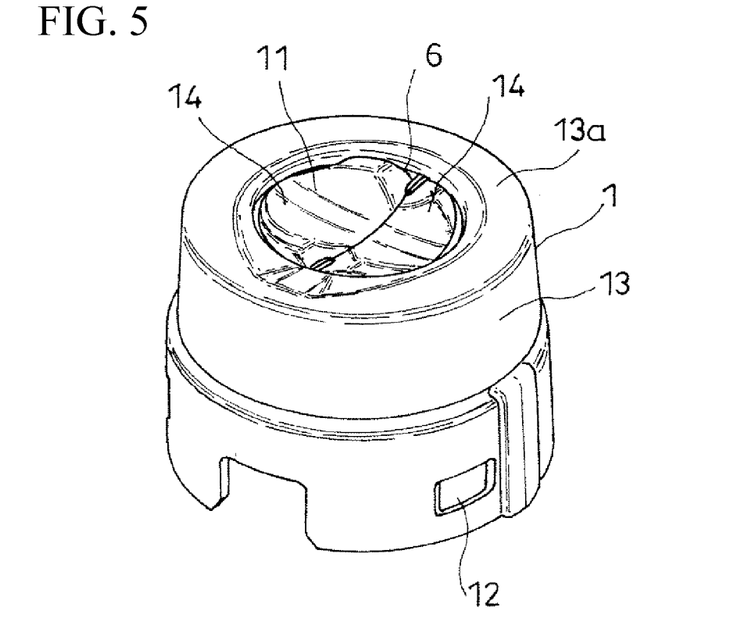
FIG. 5 is a perspective structural view of the cover member.

As shown in FIG. 5, the cover member 1 comprises a cylindrical main member 13 and the closing member 11. The cylindrical main member 13 opens a lower end, and includes an inner flange 13a forming a circumference shape at an upper end. Also, the cover member 1 has an embodiment wherein a pass-through opening of the fuel filling nozzle N is formed by narrowing down an upper end opening by the inner flange 13a. Hereinafter, such pass-through opening of the cover member 1 is called a near-side pass-through opening 6.

In the illustrated example, such cylindrical main member 13 has a substantially cylindrical shape. An inner diameter of the cylindrical main member 13 is substantially equal to an outer diameter of the holder member 4 on the upper end 42 side.

As shown in FIG. 11, in the closed position, the closing member 11 presses the inner flange 13a from a lower side to close the near-side pass-through opening 6, thereby maintaining the closed state of the fuel filling aperture 5 unless the fuel filling nozzle N is inserted. In the illustrated example, as shown in FIG. 12, such closing member 11 is provided with a pair of flap members 14 and 14, and urging devices 15 positioning each of the pair of flap members 14 to the closed position by urging.

The pair of flap members 14 and 14 is respectively provided with turning assembly portions 141 which become a center of the turning; and abutment portions 142 relative to the other of the flap members 14.

Figure 6:
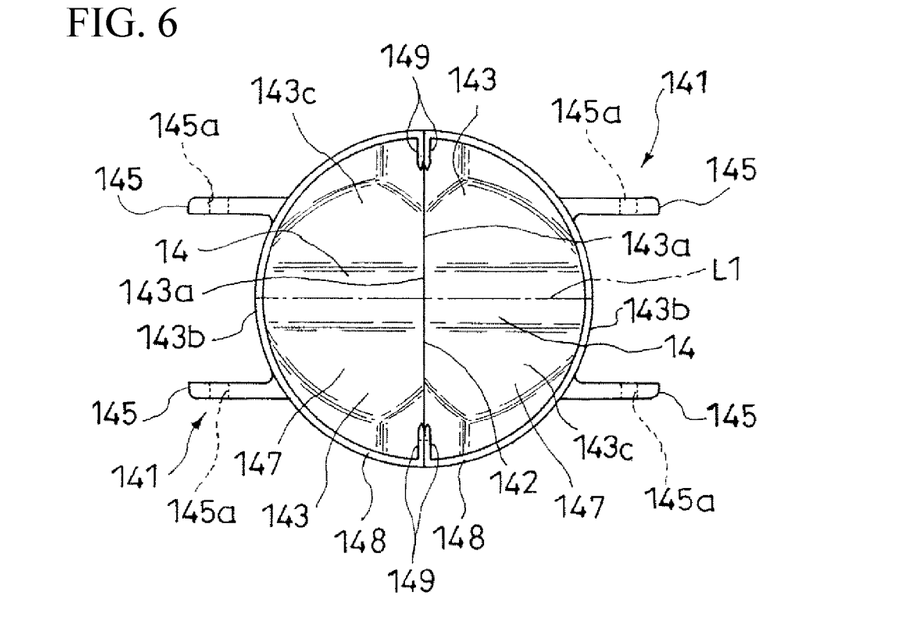
FIG. 6 is a plan structural view showing a state wherein a pair of flap members forming the cover member is located in a closed position by showing only the pair of flap members.
Figure 7:
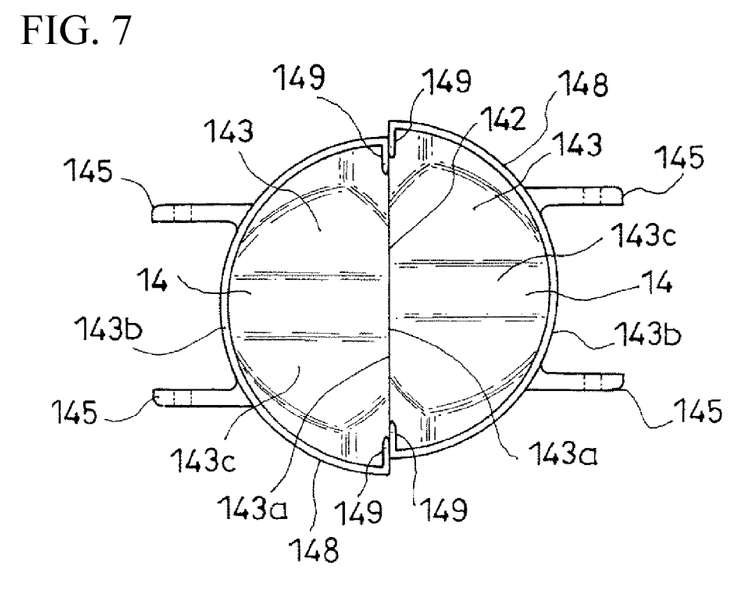
FIG. 7 is a plan structural view showing a case wherein the pair of flap members shifts in the state of FIG. 6.
Figure 8:
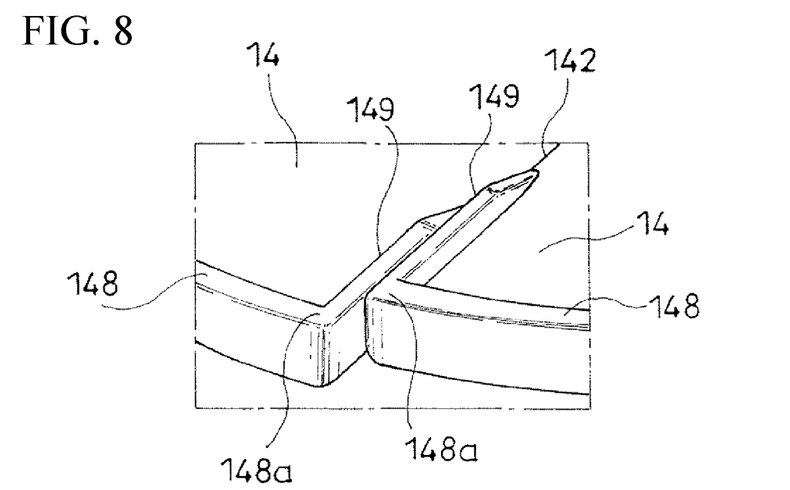
FIG. 8 is a perspective structural view of essential parts in the state of FIG. 7.
Figure 10:
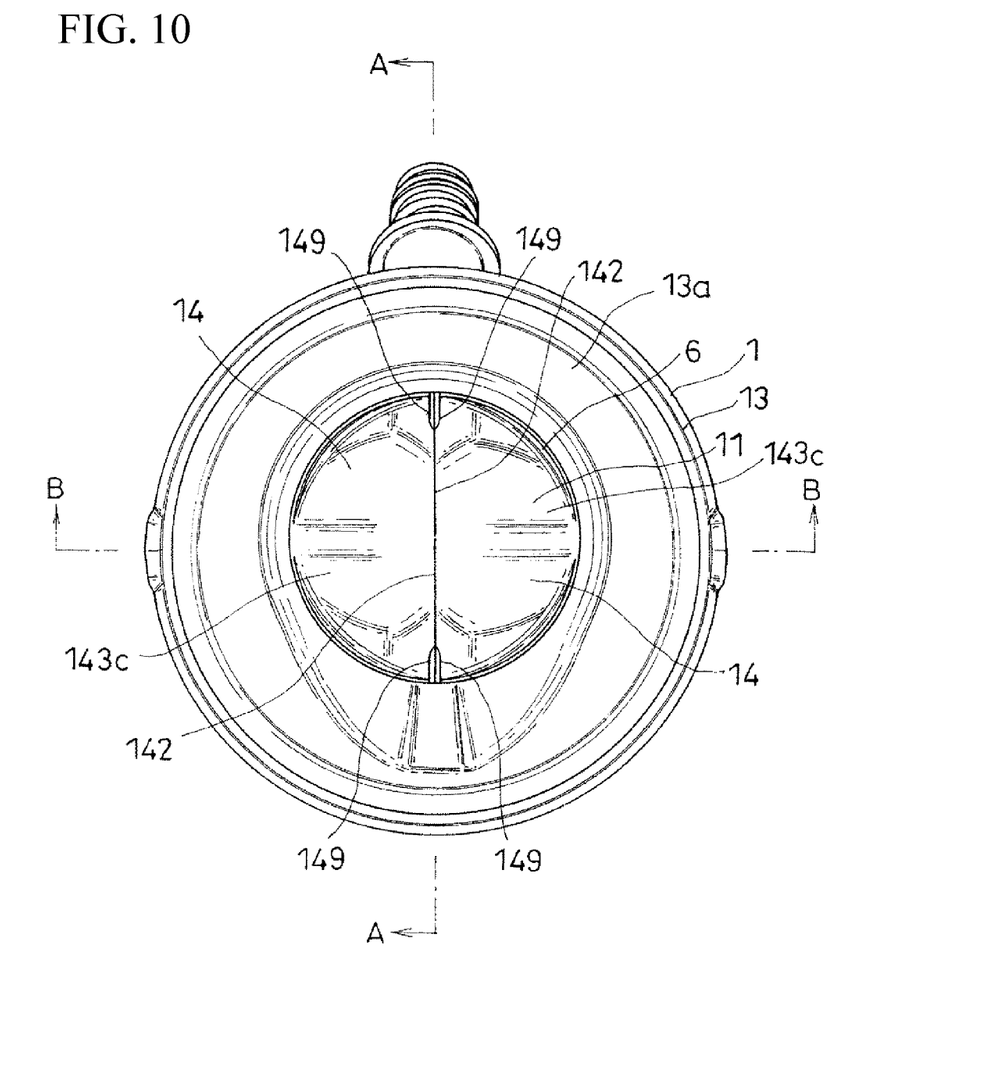
FIG. 10 is a plan view of the fuel filling aperture device.

In the illustrated example, as shown in FIG. 10, the near-side pass-through opening 6 has a circular hole shape. As shown in FIG. 6, the pair of flap members 14 and 14 respectively includes main member portions 143 having a semicircular shape in a state of a plan view. Namely, the main member portions 143 of the pair of flap members 14 and 14 respectively include straight portions 143a and arc-shaped portions 143b, and in the closed position, both of the straight portions 143a abut against each other, so that two main member portions 143 and 143 form a circular plate shape as a whole. Namely, the straight portions 143a in the main member portions 143 of such flap members 14 function as the abutment portions 142.

Figure 12:
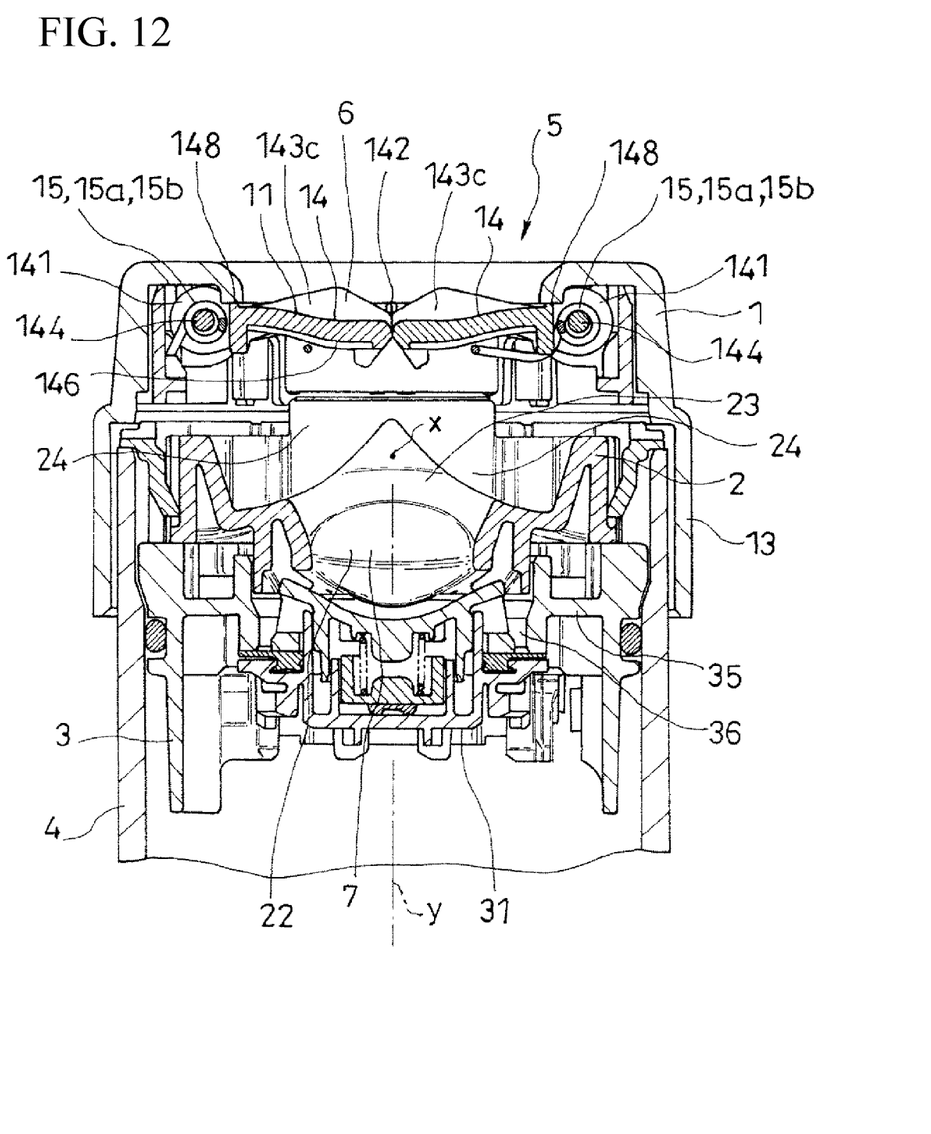
FIG. 12 is a cross-sectional structural view taken along a position of line B-B in FIG. 10.
Figure 13:
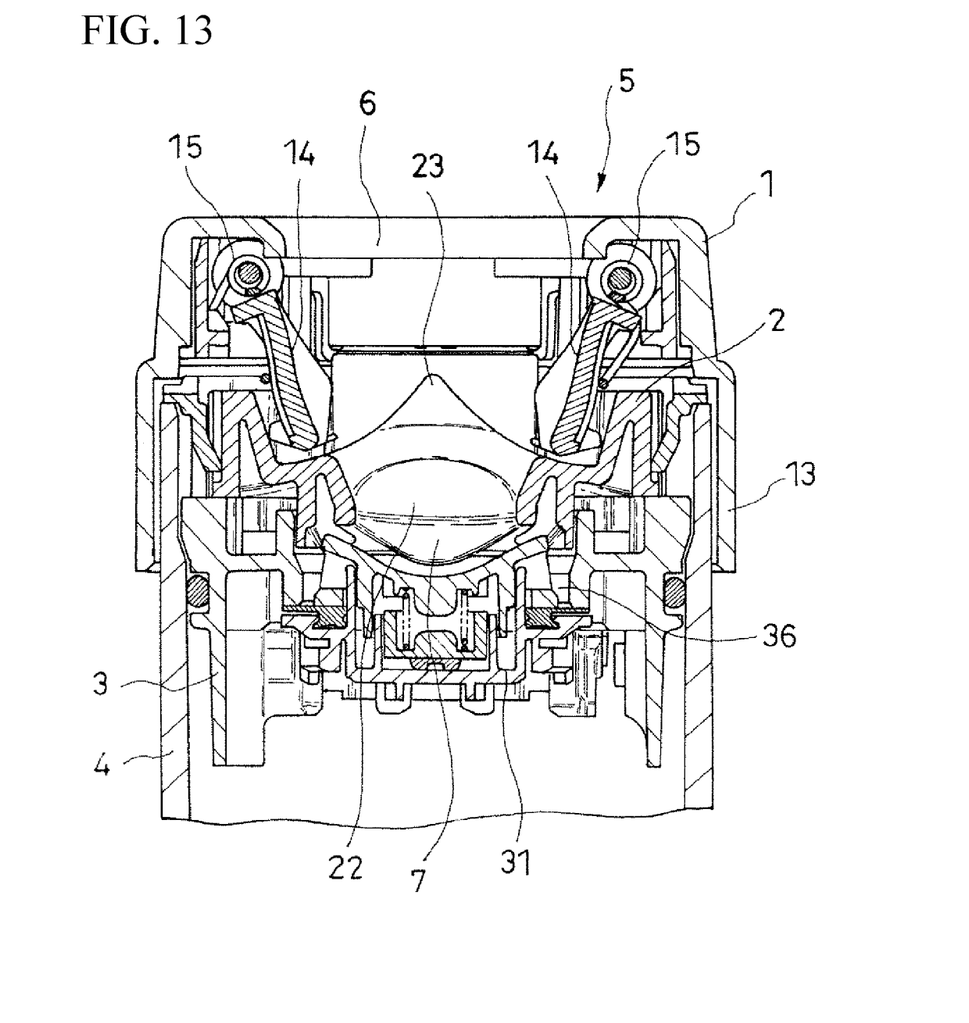
FIG. 13 is cross-sectional structural view taken along a position of line B-B in FIG. 10, and shows a condition wherein the pair of flap members turns to an open position.
Figure 14:
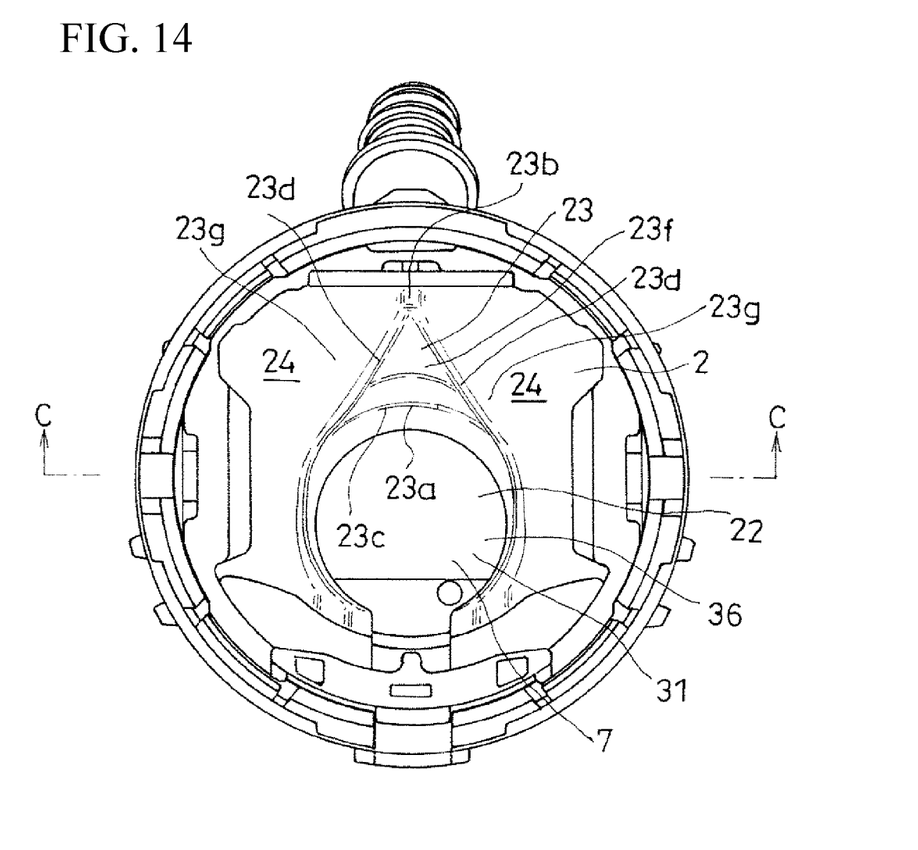
FIG. 14 is a plan structural view on a filler pipe side in the state of FIG. 2.
Figure 15:
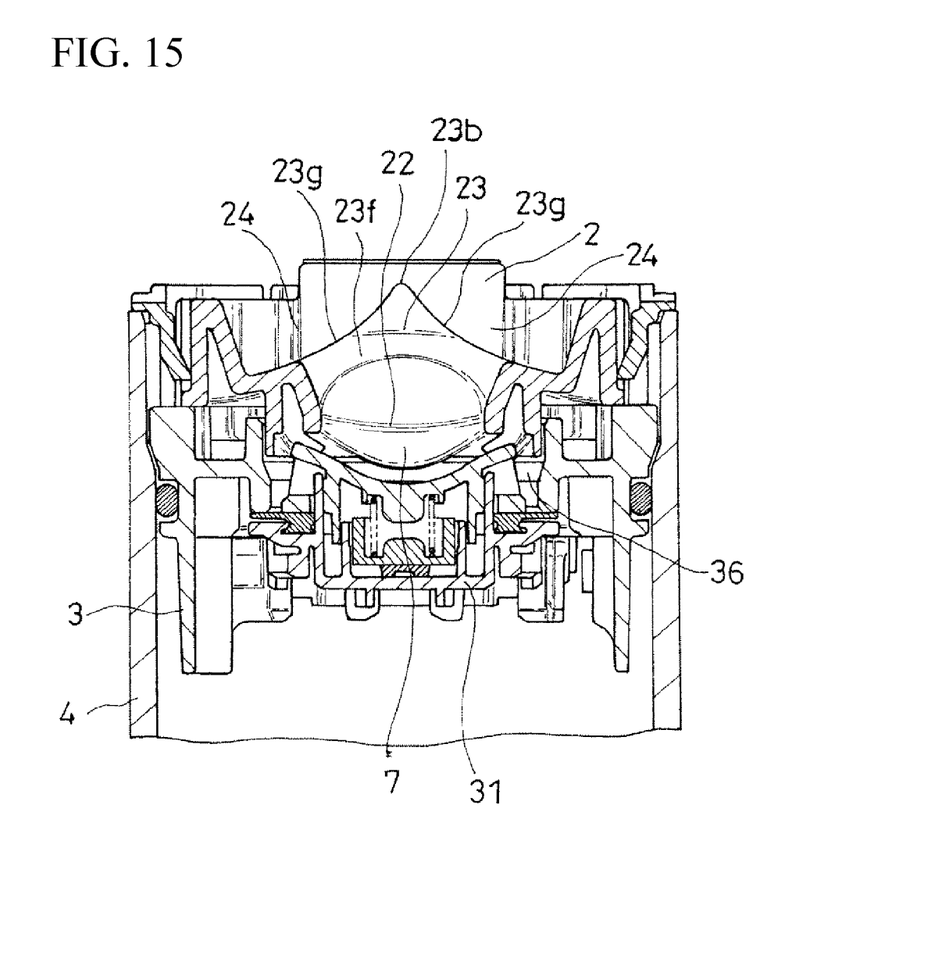
FIG. 15 is a cross-sectional structural view taken along a position of line C-C in FIG. 14.

In the illustrated example, as shown in FIG. 12, the flap members 14 are turnably combined with the cylindrical main member 13 with turning shafts 144 placed outside the arc-shaped portions 143b of the main member portion 143, and wherein a shaft center line thereof is located parallel to the straight portions 143a. As shown in FIG. 6, a pair of arm portions 145 and 145 protrudes outwardly from the arc-shaped portions 143b of the main member portions 143, and turnably assembles the flap members 14 inside the cylindrical main member 13 by passing the turning shafts 144 through shaft holes 145a formed in the arm portions 145.

In the illustrated example, the urging devices 15 are torsion coil springs 15a placed between the pair of arm portions 145 and 145 by passing the turning shafts 144 through spring winding portions 15b, and one spring end of the torsion coil spring 15a abuts against a back surface portion 146 of the flap member 14, and the other spring end of the torsion coil spring 15a is fixed on the cylindrical main member 13 side.

As shown in FIG. 6, on surface portions 147 of the pair of flap members 14 and 14, there are respectively formed seal projecting pieces 148 abutting against an opening edge portion of the near-side pass-through opening 6 for the fuel filling nozzle N, i.e., an inner face 13b of the inner flange 13a at the closed position; and edge projecting pieces 149 continuing to terminals 148a of the seal projecting pieces 148, and forming at least one portion of the abutment portions 142.

In the embodiment, the seal projecting piece 148 is formed in such a way so as to form an edge of the whole arc-shaped portion 143b of the main member portion 143 of the flap member 14. Then, in the closed position, the flap member 14 abuts the seal projecting piece 148 against the inner face 13b of the inner flange 13a without a gap so as to seal between the arc-shaped portion 143b of the main member portion 143 and the cylindrical main member 13.

Thereby, in the embodiment, even in a case wherein both of the pair of flap members 14 and 14 or one of the pair of flap members 14 and 14 slightly shift or shifts to a position in a shaft center line direction of the turning shaft 144 thereof from a predetermined position (see FIG. 7), the edge projecting piece 149 of the flap member 14 located at the closed position can press the opening edge portion of the near-side pass-through opening 6, i.e., the inner face 13b of the inner flange 13a, and even in such a case, a sealing performance of the closing member 11 does not decline.

Also, in the embodiment, on the surface portions 147 of the flap members 14, there are formed groove-shaped recessed portions 143c wherein a cross-sectional shape in a direction parallel to a central axis of the turning, i.e., an axis center line of the turning shafts 144 has an arc shape (see FIG. 6). In the illustrated example, the groove-shaped recessed portion 143c is formed such that a position above a virtual first straight line L1 connecting a center of the arc-shaped portion 143b and a center of the straight portion 143a of the flap member 14 is the bottom; a direction formed between the straight portion 143a and the arc-shaped portion 143b along the virtual first straight line L1 is a groove length direction; a direction orthogonal to the virtual first straight line L1 is a groove width direction; and the groove-shaped recessed portion 143c becomes shallow as approaching the arc-shaped portion 143b. Then, in the illustrated example, in a state wherein the pair of flap members 14 and 14 is located in the closed position, in the abutment portion 142, the groove-shaped recessed portion 143c of one flap member 14 and the groove-shaped recessed portion 143c of the other flap member 14 align so as to be continuous (see FIG. 6). Also, in the embodiment, the edge projecting piece 149 is formed only at a portion positioned outside the groove-shaped recessed portion 143c in the abutment portion 142. Thereby, in the embodiment, when the fuel filling nozzle N is inserted, a tip of the fuel filling nozzle N abuts against the flap member 14 using the groove-shaped recessed portion 143c, and the edge projecting piece 149 is provided at a portion wherein the above-mentioned abutment does not occur.

(Guide Member 2)

As shown in FIG. 12, the guide member 2 is fitted between an upper end of the seal member 3 and the partition wall 35 from an upper end side of the seal member 3. In the guide member 2, in the aforementioned fitted state, there is formed a pass-through opening 22 positioned above the pass-through opening 36 of the seal member 3.

In the illustrated example, on a back side of the closing member 11, there is formed a back-side pass-through opening 7 for the fuel filling nozzle N by the pass-through opening 36 of the seal member 3 and the pass-through opening 22 of the guide member 2.

Figure 9:
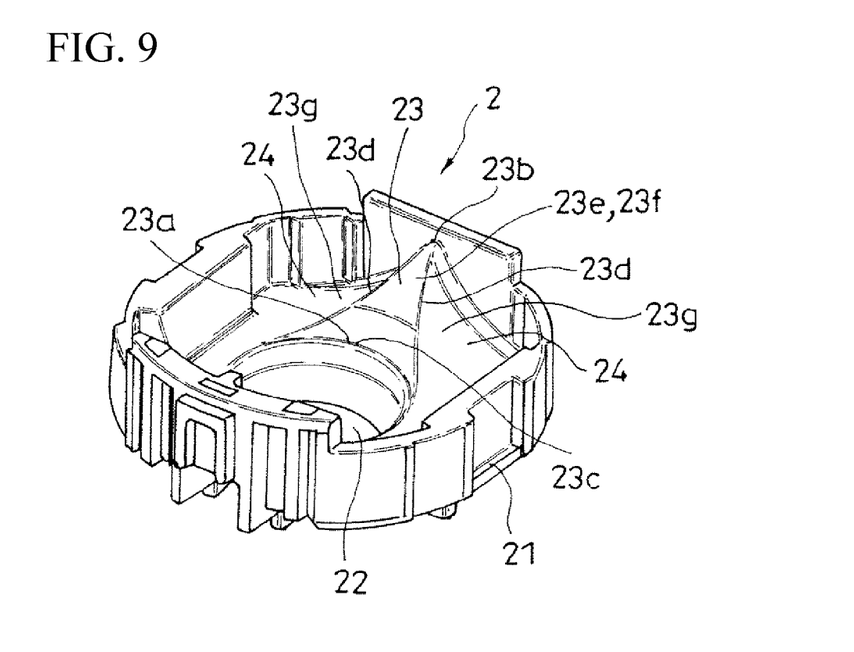
FIG. 9 is a perspective structural view of the guide member.

Also, as shown in FIG. 9, on an upper face of the guide member 2, there are provided guide slope faces 23 for the fuel filling nozzle N, which are slope faces wherein an opening edge of the pass-through opening 22, i.e., an opening edge of the back-side pass-through opening 7 is a slope lower end 23a, and wherein a vicinity of the later-described near-side pass-through opening 6 of the cover member 1 is a slope upper end 23b. Also, the guide slope faces 23 are formed on both sides of a directly underneath position x including the directly underneath position x (see FIG. 12) of the abutment portions 142 of the flap members 14 forming the closing member 11 located in the closed position.

The guide slope face 23 includes a slope gradually increasing a distance from a virtual center axis y of the back-side pass-through opening 7, and gradually reducing a width in a direction orthogonal to the virtual center axis y as approaching the slope upper end 23b (see FIG. 11 and FIG. 12).

Also, in the embodiment, the fuel filling aperture device is installed in such a way so as to obliquely intersect the virtual center axis y of the back-side pass-through opening 7 relative to a vertical line z (see FIG. 11), and the guide slope face 23 is formed at a portion positioned on an upper side sandwiching the virtual center axis y (see FIG. 11).

More specifically, the guide slope face 23 is formed by an assembly of a virtual straight line which is the virtual straight line in a direction orthogonal to the turning shaft 144 of the flap member 14, and passes the directly underneath position x. In a state of a plan view, the guide slope face 23 has a triangle shape wherein the back-side pass-through opening 7 is a base 23c (see FIG. 14).

Also, as shown in FIG. 9, outside the guide slope face 23, there are formed spaces 24 allowing the flap members 14 located in the closed position to move to the open position. In the illustrated example, outside two oblique sides 23d and 23d of the guide slope face 23, there are respectively formed the spaces 24. Specifically, the guide slope face 23 is formed by a raised-portion front face 23f facing the back-side pass-through opening 7 in a mountain-shaped raised portion 23e formed on an upper face side of the guide member 2. On right and left of the raised-portion front face 23f, respectively, there are formed raised-portion side faces 23g formed in such a way so as to gradually reduce a cross-sectional area of the mountain-shaped raised portion 23e as approaching upwardly. Thereby, on the right and left of the raised-portion front face 23f, i.e., the guide slope face 23, there are respectively formed the spaces 24. The oblique side 23d and the raised-portion side face 23g of the guide slope face 23 form the same face, and are formed in such a way so as to follow a turning track of the straight portion 143a of the flap (see FIG. 12 and FIG. 13). Thereby, the flap members 14 located in the closed position are allowed to move to the open position. Especially, in the embodiment, it is set such that a gap is not almost formed between the oblique side 23d and the raised-portion side face 23g of the guide slope face 23, and the straight portion 143a which becomes a free end of the flap member 14. This is to smoothly guide the fuel filling nozzle N to the back-side pass-through opening 7, and to prevent a spiral wire material (called an anchor spring and the like) (not shown in the drawings) provided in an outer peripheral portion of the fuel filling nozzle N from falling between the flap member 14 located in the open position, and the guide slope face 23 and the raised-portion side face 23g.

When an insertion operation into the fuel filling aperture 5 of the fuel filling nozzle N of the fuel filling gun is carried out, first, the pair of flap members 14 and 14 forming the closing member 11 turns to the open position so as to allow the fuel filling nozzle N to enter a back from the near-side pass-through opening 6. When the fuel filling nozzle N enters the back from the near-side pass-through opening 6, the fuel filling nozzle N can be guided to the back-side pass-through opening 7 by abutting the tip of the fuel filling nozzle N against the guide slope faces 23, wherein the opening edge of the back-side pass-through opening 7 is the slope lower end 23a, and wherein the vicinity of the near-side pass-through opening 6 is the slope upper end 23b, formed on both sides of the directly underneath position x including the directly underneath position x of the abutment portions 142 of the flap members 14 located in the closed position.

In the embodiment, the fuel filling aperture device is installed in such a way so as to obliquely intersect the virtual center axis y of the back-side pass-through opening 7 relative to the vertical line z, so that the guide slope face 23 positioned on the upper side of the virtual center axis y is positioned in front of the fuel filling nozzle N entering in the aforementioned manner, and the fuel filling nozzle N is smoothly guided to the back-side pass-through opening 7 positioned on a lower side of the guide slope face 23 by the guide slope face 23.

Incidentally, obviously, the present invention is not limited to the embodiment explained hereinabove, and includes all embodiments which can obtain the object of the present invention.

EXPLANATION OF SYMBOLS

N a fuel filling nozzle
11 a closing member
14 flap members
141 turning assembly portions
142 abutment portions
147 surface portions
148 seal projecting pieces
148a terminals
149 edge projecting pieces
15 urging devices
5 a fuel filling aperture Incidentally, all contents of the specification, claims, drawings, and abstract of Japanese Patent Application No. 2015-200985 filed on Oct. 9, 2015 are cited in their entireties herein and are incorporated as a disclosure of the specification of the present invention.

What is claimed is:

1. A fuel filling aperture device, comprising:
   a closing member turned to an open position by an insertion of a fuel filling nozzle to open a fuel filling aperture,
   wherein the closing member includes a pair of flap members, and urging devices urging the respective pair of flap members to be positioned at a closed position,
   the pair of flap members respectively includes a turning assembly portion which becomes a center of turning, and an abutment portion relative to another flap member, and
   a surface portion of each of the pair of flap members includes a seal projecting piece configured to abut against an opening edge portion of a pass-through opening of the fuel filling nozzle at the closed position, and an edge projecting piece continuing to a terminal of the seal projecting piece and forming an edge of at least one portion of the abutment portion.

2. A fuel filling aperture device according to claim 1, wherein each of the pair of flap members has a semicircular shape in which a straight portion thereof is the abutment portion, and includes the seal projecting piece in such a way so as to form an edge of an arc-shaped portion.

3. A fuel filling aperture device according to claim 1, wherein a surface portion of the flap member includes a groove-shaped recessed portion in which a cross-sectional shape in a direction parallel to a center axis of turning has an arc shape, and the edge projecting piece is formed only in a portion positioned outside the groove-shaped recessed portion in the abutment portion.

* * * * *